Patented Dec. 16, 1952

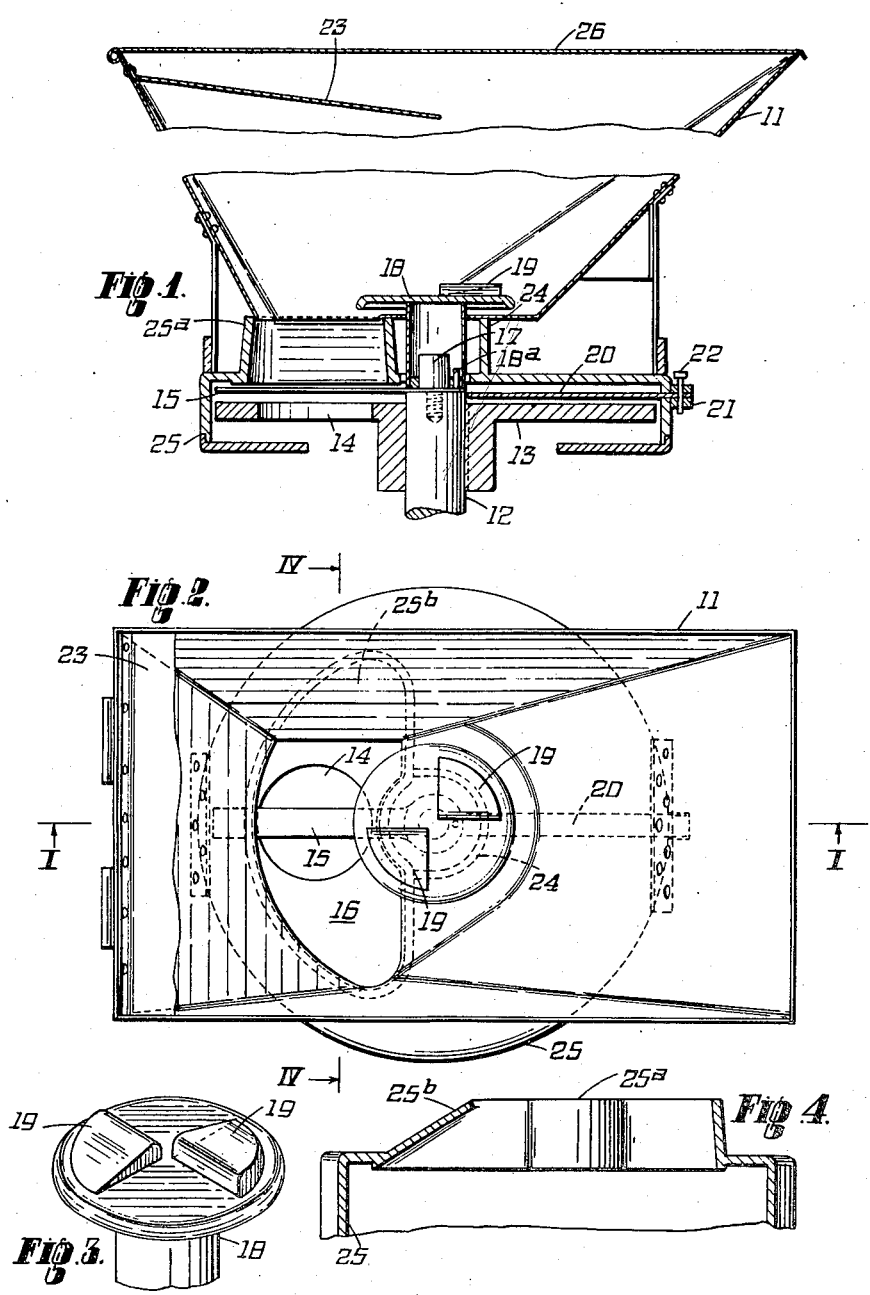

2,621,694

UNITED STATES PATENT OFFICE 2,621,694

VEGETABLE SLICER WITH AGITATOR IN FEED HOPPER

Ernest Nelson, Deepdale, Preston, Harold Nelson and Thomas Butler Nelson, Holme Slack, Preston, and Frank Nelson, Preston, England Application August 18, 1950, Serial No. 180,212
In Great Britain August 19, 1949

2 Claims. (Cl. 146—124)

This invention concerns feed hoppers.

An object of the invention is to provide an arrangement whereby material, especially in a lower region of a feed hopper may be agitated to ensure regular or continuous discharge.

The invention is particularly applicable to feed hoppers adapted to contain vegetables such as potatoes which are mechanically sliced after discharge. Such feed hoppers are of the type having a plate adapted to rotate beneath the hopper outlet, a knife being arranged to rotate with the plate and between the plate and the hopper outlet so as to pass intermittently over the outlet. An aperture in the plate immediately beneath the knife provides for the egress of cut material from the cutting arrangement.

A disadvantage of this type of machine is that when it is set to cut thin slices of material, for instance, of potato to make potato crisps, slices are of varying thickness due to the intermittent vertical movement of the potatoes caused by the rotating plate on which they rest.

A further object of the invention, therefore, is to avoid this disadvantage particularly when very thin slices are being cut.

According to the present invention a feed hopper assembly of the type referred to includes an agitator mounted above the support plate and the knife on the upper end of a driving shaft which rotates said support plate and knife. The face of the agitator is preferably divided into four quadrantal portions of which two opposite portions are flat and the other two portions present a sloping face rising from the plane defined by the said flat portions and terminating in a shoulder, which may be radiused.

The hopper may also include an internal cover plate adapted to serve as an abutment for the contents of the hopper as they are urged to one region of the hopper by movement of the agitator, the rotating support and the centrifugal force they experience. The cover plate preferably encloses in conjunction with the support plate a generally wedge shaped volume in which objects of various sizes may be satisfactorily retained.

The invention will be described further with reference to the accompanying drawings in which:

Fig. 1 is a sectional elevation on the line I—I of Fig. 2;

Fig. 2 is a plan view corresponding to Fig. 1 with the deflector plate partly removed for clarity;

Fig. 3 is a perspective view of the agitator, and

Fig. 4 is a detailed view of the hopper outlet and cover plate on line IV—IV of Fig. 2.

The operative portions of a vegetable cutting machine comprise a driving shaft 12, a rotating support plate 13, secured thereto, a knife 15 also secured thereto and disposed above said support plate 13, a machine casing 25, an upstanding flange portion 25a of which defines a reception aperture from a hopper 11 at the top of the machine.

The plate 13 may be axially slidable on the shaft 12 so that the distance between it and the outlet from the hopper may be varied. Any known means may be provided for the control of this distance, by varying which the thickness of slice cut by the knife 15 may be altered. The reception aperture is substantially semi-circular and a hole 14 in the rotating support plate 13 immediately beneath the knife 15 is adapted to pass beneath the aperture intermittently as the driving shaft 12 rotates. A stud 17 is threadedly engaged in the upper end of the driving shaft 12 which end also has protruding therefrom an offset pin 18a.

An agitator 18 has a small diameter portion suitably bored so that it may be located on the stud 17 and the pin 18a for driving purposes and a large diameter face downwardly dished at its outer periphery on which are provided two quadrantal portions 19 which rise gradually from the flat face of the large diameter portion up to a substantially radial shoulder which is radiused along its upper edge. The small diameter portion of the agitator 18 is shrouded by a flange 24 integral with the casing 25. The flange 24 abuts the underside of the large diameter portion of the agitator 18 and surrounds the small diameter portion of the agitator 18 down to the enclosed bottom wall of the hopper. This flange, along with the downwardly dished outer periphery of the agitator, prevents water, which may be associated with the contents of the hopper from passing into contact with the driving shaft and thus avoids damage, due to such water percolating into the shaft bearing. The face of the agitator 18 extends into the lower region of the hopper 11 and its extreme periphery overhangs the central portion of the semi-circular aperture. The face is capable of supporting a substantial fraction of the material in the hopper.

A deflector plate 23 is secured within the hopper 11 to deflect fed material towards the agitator whilst a cover plate 26 is hinged to the hopper 11 to provide a removable closure therefor.

A stationary wiper plate 20 passes into the casing 25 from the outer wall. It is disposed opposite the semi-circular aperture and between the knife 15 and the support plate 13, and is secured by means of a seating in a pocket 21 outside of the casing 25 to be positioned therein by a pin 22.

A cover plate 25b which may conveniently be integral with the flange 25a, encloses one end, dependent upon the direction of rotation of the machine, of the aperture. In this manner a generally wedge shaped volume is defined by the cover plate 25b parts of the walls of the flange 25a and the rotating plate 13.

In operation vegetables, for instance potatoes, are fed into the hopper 11 and immediately deflected by the deflector 23 towards the agitator 18. Due to the rotation of the agitator 18 the mass of potatoes are maintained in a continual state of agitation and moreover the shoulders of the two upstanding quadrantal portions tend to select potatoes individually and project them towards the semi-circular aperture. Potatoes so selected fall into the reception aperture, which forms a continuation of the hopper outlet, and are supported by the rotating support plate 13. Due to the movement of the support plate and the centrifugal force which they experience they tend to move beneath the cover plate 25b. Once a potato is trapped beneath the cover plate it tends to be held firmly and the passage of the knife 15 will cause a suitable slice to be severed therefrom. The potato being slightly reduced in size is urged again, due to the movement of the rotating support plate 13 and the centrifugal force further into the generally wedge shaped volume defined by the cover plate 25b and the rotating support plate 13. Here the potato is once more wedged and awaits the next cutting action. This wedging action holds the potatoes firmly to prevent slices of varying thickness being cut.

If a slice of potato should adhere to the underside of the knife 15 it will be removed as the knife passes above the wiper 20 and will fall in the normal manner through the aperture 14 in the support plate 13.

We claim:

1. A feed hopper assembly comprising in combination a hopper, a support plate beneath said hopper, means for rotating said support plate, said hopper having an outlet lying above part of the path of movement of an eccentric aperture in said support plate, a knife adapted to rotate with and above said support plate so as to pass beneath said hopper outlet simultaneously with said eccentric aperture, an agitator adapted to be rotated by said means for rotating said support plate and situated above said support plate and said knife and within said hopper, and deflector means within said hopper adapted to direct material fed therein towards said agitator, the face of said agitator presenting four substantially quadrantal portions of which two opposite quadrantal portions are flat and the other two present a surface which is gradually raised up from the plane defined by the flat portions, said gradually inclined surfaces each terminating in a substantially vertical shoulder so that said agitator is operative firstly to agitate said material vertically and secondly to select discrete portions of said material in said flat quadrantal portions and eject them by means of the respective shoulders towards said hopper outlet.

2. A feed hopper assembly as set forth in claim 1 in which said hopper has an internal cover plate disposed above that portion of said hopper outlet towards which discrete portions are directed, said cover plate disclosing in conjunction with said support plate a generally wedge-shaped volume in which objects of various sizes may be satisfactorily retained and being adapted to serve as an abutment for the contents of the hopper as they are urged therein by said agitator, said rotating support plate and the centrifugal force they experience.

ERNEST NELSON.
HAROLD NELSON.
THOMAS BUTLER NELSON.
FRANK NELSON.

REFERENCES CITED

The following references are of record in the file of this patent:

UNITED STATES PATENTS

| Number | Name | Date |
| --- | --- | --- |
| 183,132 | Clinton | Oct. 10, 1876 |
| 308,629 | Reed | Dec. 2, 1884 |
| 1,700,738 | Kier | Feb. 5, 1929 |
| 2,490,455 | Nelson | Dec. 6, 1949 |
| 2,492,260 | Bingham | Dec. 27, 1949 |